April 15, 1952      C. E. BROCKMAN      2,592,856
HANDLE MEANS AND SUPPORT STRUCTURE FOR POWER LAWN MOWERS
Filed April 3, 1950      2 SHEETS—SHEET 1
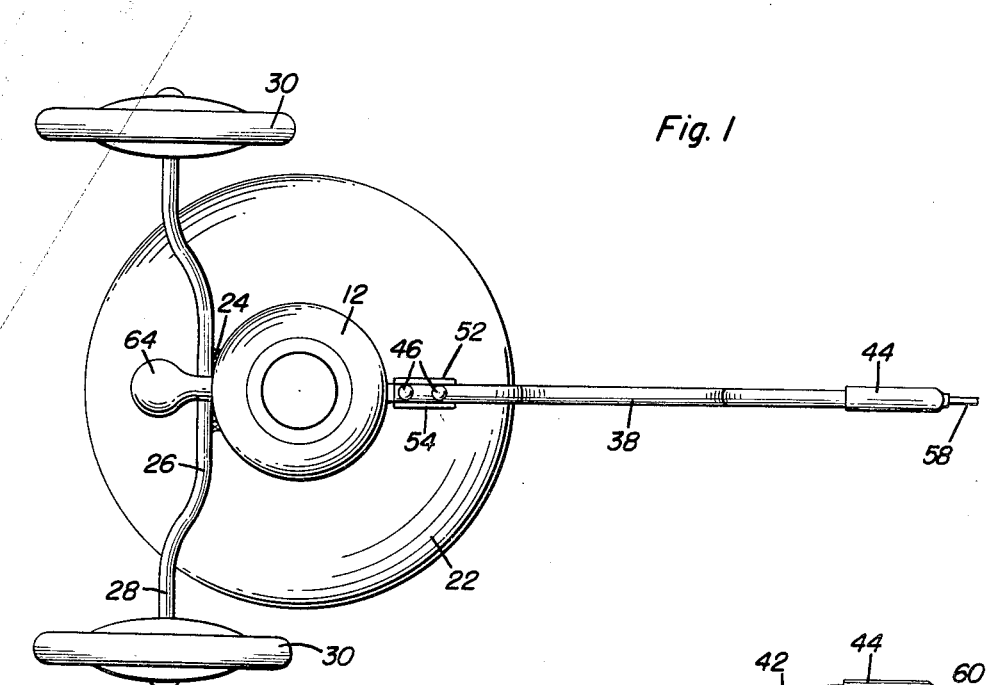
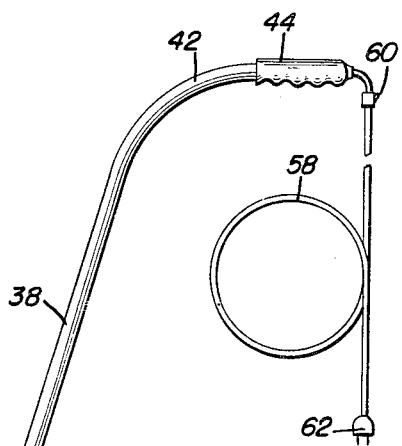
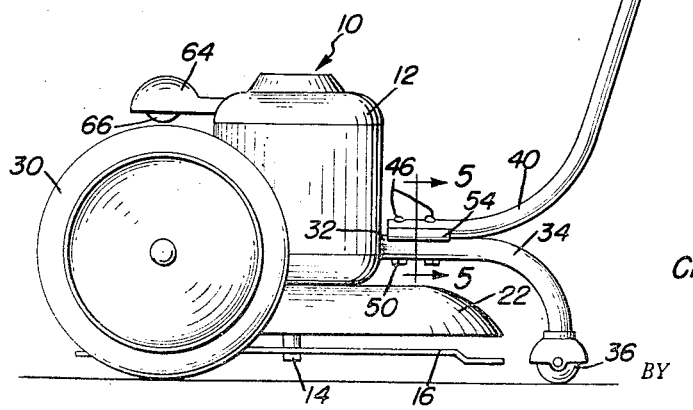
Clarence E. Brockman
INVENTOR.

April 15, 1952      C. E. BROCKMAN      2,592,856
HANDLE MEANS AND SUPPORT STRUCTURE FOR POWER LAWN MOWERS
Filed April 3, 1950      2 SHEETS—SHEET 2

Clarence E. Brockman
INVENTOR.

BY Clarence A. O'Brien
and Harvey B. Jacobson
Attorneys

Patented Apr. 15, 1952

2,592,856

UNITED STATES PATENT OFFICE 2,592,856

HANDLE MEANS AND SUPPORT STRUCTURE FOR POWER LAWN MOWERS

Clarence E. Brockman, Strafford, Mo.

Application April 3, 1950, Serial No. 153,745

1 Claim. (Cl. 180—19)

This invention relates to a lawn mower of novel construction and design having a horizontally rotatable cutter blade driven by an electric motor, the primary object of which is to provide a lawn mower which is very simple in construction, light in weight, inexpensive to manufacture, easy to manipulate, and adapted for use at night.

An important object of this invention is to provide a power lawn mower including an electric motor having a casing which serves to support an axle having rotatable wheels at its ends, a dish-shaped shield overlying a horizontally rotatable cutter operatively connected to the motor, a swivel wheel, and an elongated handle for pushing the lawn mower, the entire construction being simple, compact, and easy to maneuver. The lawn mower also includes a light bulb secured to the top of the casing and operatively connected to the motor which is energized along with the motor by a switch adjacent the upper end of the handle so that the lawn mower can be employed at night.

A further important object of this invention is to provide a novel means for guidingly and rockably retaining the handle on the means connected to the motor casing that swivelly supports a small wheel.

These, together with various ancillary objects and features of the invention which will later become apparent as the following description proceeds, are attained by the device, a preferred embodiment of which has been illustrated by way of example only in the accompanying drawings in which:

Figure 1 is a top plan view of the lawn mower;

Figure 2 is a side elevational view of the device;

Specific reference is now made to the drawings. In the several views in the accompanying drawings and in the following specification similar reference characters indicate corresponding elements throughout.

Figure 4:
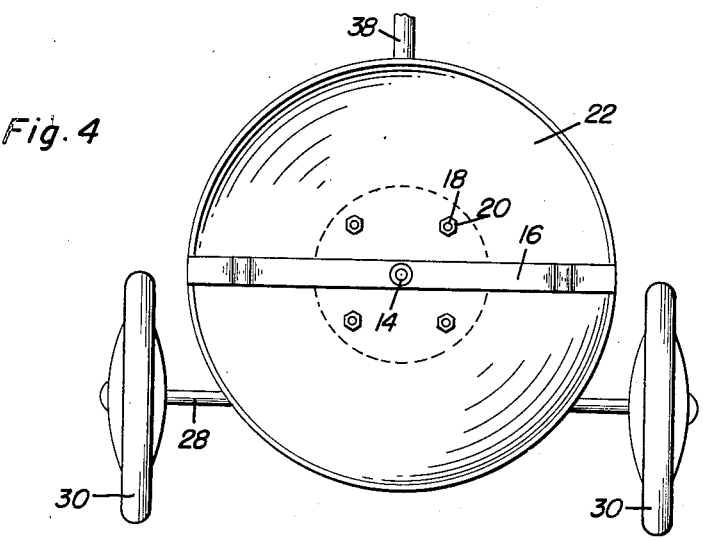
Figure 4 is a fragmentary bottom plan view of the device.
Figure 3:
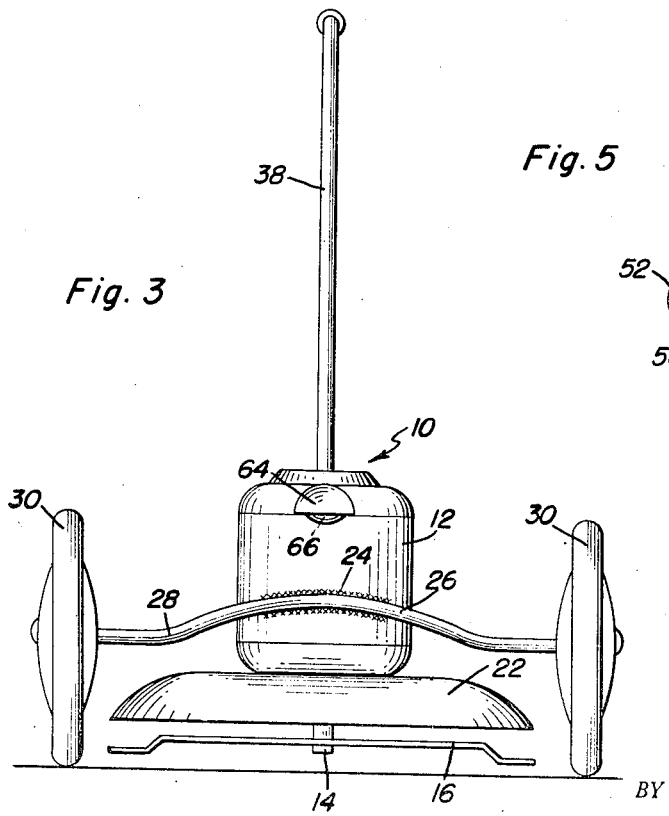
Figure 3 is a front elevational view of the device.

Indicated generally at 10 is a conventional electric motor having a casing 12 therefor and a drive shaft 14 extending vertically through the bottom of the casing. Removably secured by any suitable means to the free end of the drive shaft 14 is a cutter blade 16 which is rotatable in a horizontal plane as will be evident from the drawings. Secured to the bottom of the motor casing 12 by means of four bolts 18 and closure nuts 20 is a dish-shaped shield or pan 22 which overlies the cutter blade 16 and has a diameter approximately equal to the overall length of the cutter blade 16 and serves to deflect the grass cut by the cutter blade.

Welded to one side of the motor casing 12 directly above the shield 22 as at 24 is the upwardly bent portion 26 of an axle 28 upon the ends of which is journaled a pair of relatively large wheels 30.

Welded as at 32 to the other or opposite side of the motor casing 12 is one end of an arcuate or downwardly bent pipe 34 upon the free end of which is swivelly mounted a small wheel 36.

An elongated handle 38 is provided having bent portions 40 and 42 at its ends, the upper bent portion 42 including a rubber grip 44. A novel means is provided for removably, guidingly and rockably securing the curved portion 40 of the handle 38 to the pipe 34 and comprises the following elements. Headed bolts 46 are extended through the curved portion 40 of the handle 38 and the pipe 34, the lower ends of the bolts being threaded as at 48 to receive suitable closure nuts 50.

Figure 5:
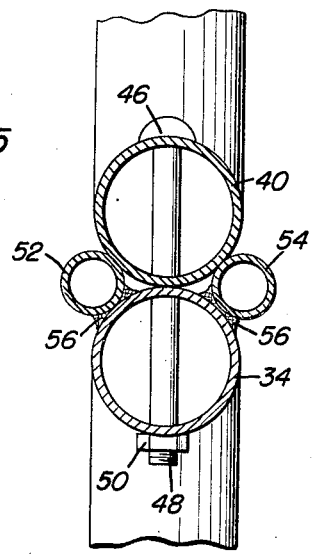
Figure 5 is a sectional view taken substantially on the plane of the section line 5—5 of Figure 2.

A pair of horizontally extending pipe sections 52 and 54 are welded along their length as at 56 to the upper portion of the pipe 34 on both sides of the headed bolts 46, the pipe sections 52 and 54 being adapted to abut the lower portion of the curved section 40 of the handle 38 as shown clearly in Figure 5. This construction permits the ready and easy attachment of the handle 38 to the pipe 34 inasmuch as the pipe sections 52 and 54 guide the lower curved portion 40 of the handle into their proper position for receiving the headed bolts 46. The pipe sections 52 and 54 also permit a limited rocking movement of the handle upon the pipe 34.

Operatively connected to the motor 10 is a long cable 58 including the usual conductive wires, the cable extending through the length of the handle 38 and including a switch 60 adjacent the grip 44 and a male plug 62 at the free end of the cable adapted to be received in a suitable female plug of an electric source (not shown). Secured to the top of the motor casing 12 on one side thereof immediately above the axle 28 and shield 22 is a conventional shade 64 including a socket for removably receiving a light bulb 66, the socket being operatively connected by any suitable means to the motor 10.

Because a relatively small motor 10 is employed and the remainder of the structural portions of the lawn mower are fabricated of suitable lightweight metals such as aluminum, aluminum alloys, magnesium alloys and the like, and because the pipe 34 and the handle 38 are tubular, the entire lawn mower is compact and light in weight and consequently easily maneuverable. The light bulb 66 permits the use of the lawn mower at night.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

Having thus described the invention, what is claimed as new is:

In a power lawn mower having a motor casing and a curved pipe secured at one of its ends thereto and supporting a swivel wheel at its other end, an elongatd tubular handle having a curved portion at one of its ends and means securing said one end portion of said tubular handle on said pipe, said means including a pair of headed bolts extending through said pipe and said one end of said handle, closure nuts received on the free ends of said bolts, and elongated pipe sections secured to said pipe on both sides of said bolts and abutting said one end portion of said handle.

CLARENCE E. BROCKMAN.

REFERENCES CITED

The following references are of record in the file of this patent:

UNITED STATES PATENTS

| Number | Name | Date |
|---|---|---|
| 1,754,706 | Xardell | Apr. 15, 1930 |
| 1,770,137 | Husted | July 8, 1930 |
| 1,823,215 | Seal | Sept. 15, 1931 |
| 1,849,953 | Phalen | Mar. 15, 1932 |
| 2,082,764 | Hosier | June 1, 1937 |
| 2,265,443 | McGuire | Dec. 9, 1941 |
| 2,265,545 | Phelps | Dec. 9, 1941 |
| 2,480,944 | Malpass | Sept. 6, 1949 |
| 2,498,796 | Downer | Feb. 28, 1950 |